(12) United States Patent
Yi-Chang

(10) Patent No.: US 8,089,760 B2
(45) Date of Patent: Jan. 3, 2012

(54) NOTEBOOK COMPUTER

(75) Inventor: Yeh Yi-Chang, Hsichih (TW)

(73) Assignee: Acer Incorporated, Taipei County, Hsichih (TW)

( * ) Notice: Subject to any disclaimer, the term of this patent is extended or adjusted under 35 U.S.C. 154(b) by 251 days.

(21) Appl. No.: 12/590,896

(22) Filed: Nov. 16, 2009

(65) Prior Publication Data

US 2011/0038119 A1    Feb. 17, 2011

(30) Foreign Application Priority Data

Aug. 11, 2009   (TW) ................................ 98127029 A

(51) Int. Cl.
G06F 1/16 (2006.01)

(52) U.S. Cl. ......... 361/679.59; 361/679.27; 361/679.55; 361/679.56; 312/223.1; 312/223.2; 248/166; 248/917

(58) Field of Classification Search .............. 361/679.59
See application file for complete search history.

(56) References Cited

U.S. PATENT DOCUMENTS

| | | | | |
|---|---|---|---|---|
| 4,960,256 A * | 10/1990 | Chihara et al. | ............. | 248/286.1 |
| 5,085,394 A * | 2/1992 | Torii | ............................. | 248/455 |
| 5,200,913 A * | 4/1993 | Hawkins et al. | ......... | 361/679.09 |
| 5,209,448 A * | 5/1993 | Hatanaka et al. | ............. | 248/455 |
| D358,374 S * | 5/1995 | Yamazaki et al. | ............ | D14/320 |
| 6,016,248 A * | 1/2000 | Anzai et al. | .............. | 361/679.59 |
| 6,301,101 B1 * | 10/2001 | Anzai et al. | ................ | 361/679.3 |
| 6,351,372 B1 * | 2/2002 | Kim | ......................... | 361/679.15 |
| 6,430,038 B1 * | 8/2002 | Helot et al. | .............. | 361/679.05 |
| 6,538,642 B2 * | 3/2003 | Tsai | .............................. | 345/168 |
| 6,816,365 B2 * | 11/2004 | Hill et al. | ................. | 361/679.44 |
| 6,903,927 B2 * | 6/2005 | Anlauff | ..................... | 361/679.28 |
| 6,947,279 B2 * | 9/2005 | Cheng et al. | ............. | 361/679.06 |
| 6,967,836 B2 * | 11/2005 | Huang et al. | ............. | 361/679.46 |
| 7,011,285 B2 * | 3/2006 | Wang et al. | .................... | 248/673 |
| D535,292 S * | 1/2007 | Shi et al. | ....................... | D14/315 |
| 7,206,196 B2 * | 4/2007 | Ghosh et al. | ............. | 361/679.09 |
| 7,293,747 B2 * | 11/2007 | Wang et al. | ................ | 248/125.2 |
| 7,327,560 B1 * | 2/2008 | Tabasso et al. | .......... | 361/679.09 |
| 7,355,843 B2 * | 4/2008 | Riddiford | ................ | 361/679.27 |
| 7,686,261 B2 * | 3/2010 | Shi et al. | ....................... | 248/166 |

(Continued)

FOREIGN PATENT DOCUMENTS

TW    249084 M    11/2004

(Continued)

*Primary Examiner* — Jinhee Lee
*Assistant Examiner* — Anthony Q Edwards
(74) *Attorney, Agent, or Firm* — Hudak, Shunk & Farine Co. LPA

(57) ABSTRACT

A notebook computer includes a base; a top cover pivotally coupled via a first rotary shaft to the base and including a display panel disposed at an inner side thereof; a first plate member provided on an outer side of the top cover, a third plate member pivotally coupled at an end to the base via a second rotary shaft; and a second plate member pivotally coupled at an end to the first plate member and slidably coupled at an opposing end to the third plate member, such that the second and the third plate member are displaceable relative to each other. When the top cover is pivotally turned to an operation position, the second end of the second plate member is pushed against the third plate member to restrict the top cover and the third plate member from turning further, and hold the top cover to the operation position.

12 Claims, 7 Drawing Sheets

U.S. PATENT DOCUMENTS

| | | | | |
|---|---|---|---|---|
| 7,817,408 B2 * | 10/2010 | Chiang et al. | ............ | 361/679.07 |
| 7,859,853 B2 * | 12/2010 | Schmeisser et al. | .......... | 361/752 |
| 8,004,834 B2 * | 8/2011 | Shih et al. | ................ | 361/679.55 |
| 8,014,147 B2 * | 9/2011 | Chen et al. | ............... | 361/679.56 |
| 2003/0021086 A1 * | 1/2003 | Landry et al. | ................ | 361/683 |
| 2005/0139740 A1 * | 6/2005 | Chen et al. | ................ | 248/286.1 |
| 2007/0030634 A1 * | 2/2007 | Maskatia | ..................... | 361/683 |

FOREIGN PATENT DOCUMENTS

TW               343197 M     10/2008

* cited by examiner

A-A

B-B

NOTEBOOK COMPUTER

FIELD OF THE INVENTION

The present invention relates to a notebook computer, and more particularly to a notebook computer that is provided with plate members to stably support a top cover of the notebook computer to an operation position for use.

BACKGROUND OF THE INVENTION

Following the progress in different technological fields and in response to the consumers' demands for mobile computing, a notebook computer that allows a user to carry around has been developed for use at any place, such as at home, in the office, in a coffee shop, at the airport, on an airplane or on a bus.

Meanwhile, the quickly developed touch screen has been gradually applied to personal digital assistants (PDAs) and tablet computers. To facilitate convenient working on a tablet computer through touching the screen, the tablet computer usually includes a base, a touch screen, and a twin-rotating-axis structure for pivotally connecting the touch screen to the base. The twin-rotating-axis structure allows the touch screen to pivotally rotate relative to the base horizontally or vertically. When a user wants to operate the tablet computer, the touch screen can be turned about the twin-rotating-axis structure to face away from the base and locate thereon. That is, the base supports the touch screen thereon, so that the touch screen allows the user to touch it without causing wobbling.

However, in the case of a prior art notebook computer, the base and the display panel thereof are usually pivotally turnably coupled to each other via one single rotary shaft. This type of notebook computer is designed to open and close as a clamshell. When the clamshell notebook computer is provided with a touch display panel, the following problems will be encountered: when the display panel of the clamshell notebook computer is turned to an operation position, the center of gravity of the whole computer will move from a center of the base to one side of thereof or even to a point out of the base, bringing the whole notebook computer into an unbalanced and unstable condition. When a user touches the display panel with fingers or a touch pen, the force applied by the user's touch to the display panel on the unstable notebook computer will undesirably bring the computer to wobble, preventing the user from smoothly working on the notebook computer.

SUMMARY OF THE INVENTION

It is therefore a primary object of the present invention to provide a notebook computer that is provided with additional plate members to form a linkage, which is movable along with a top cover of the notebook computer when the top cover is pivotally turned relative to a base from a closed position to an operation position, preventing the notebook computer from wobbling while being manipulated by a user.

To achieve the above and other objects, the notebook computer according to an embodiment of the present invention includes a base, a top cover, a first rotary shaft, a second rotary shaft, and a first, a second, and a third plate member. The top cover is provided on an inner side with a display panel, and is pivotally coupled via the first rotary shaft to the base, so that the top cover is turnable relative to the base between a closed position and an opened operation position. The first plate member is attached to an outer side of the top cover, the third plate member is pivotally coupled at an end to the base via the second rotary shaft, and the second plate member is pivotally coupled at a first end to the first plate member and slidably coupled at an opposing second end to the third plate member, such that the second and the third plate member are displaceable relative to each other. A height difference exists between the first and the second rotary shaft. When the top cover is pivotally turned from the closed position to the operation position to expose the display panel for use, the second end of the second plate member is pressed against the third plate member to restrict the top cover and the third plate member from turning further, and the second and the third plate member cooperatively support the top cover to the operation position.

In brief, the notebook computer according to the present invention provides one or more of the following advantages:

(1) The second and third plate members cooperatively stably support and hold the display panel of the notebook computer to the operation position, preventing the display panel from wobbling and displacing when a user touches the display panel while working on the notebook computer;

(2) The second and third plate members are coupled to each other and displaceable relative to each other at the same time, allowing the two plate members to automatically move to an extended position for stably supporting the display panel when the display panel is turned to the operation position; and (3) The second and third plate members are coupled to each other and displaceable relative to each other at the same time, allowing the two plate members to automatically move to a collapsed position when the display panel is turned to the closed position.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
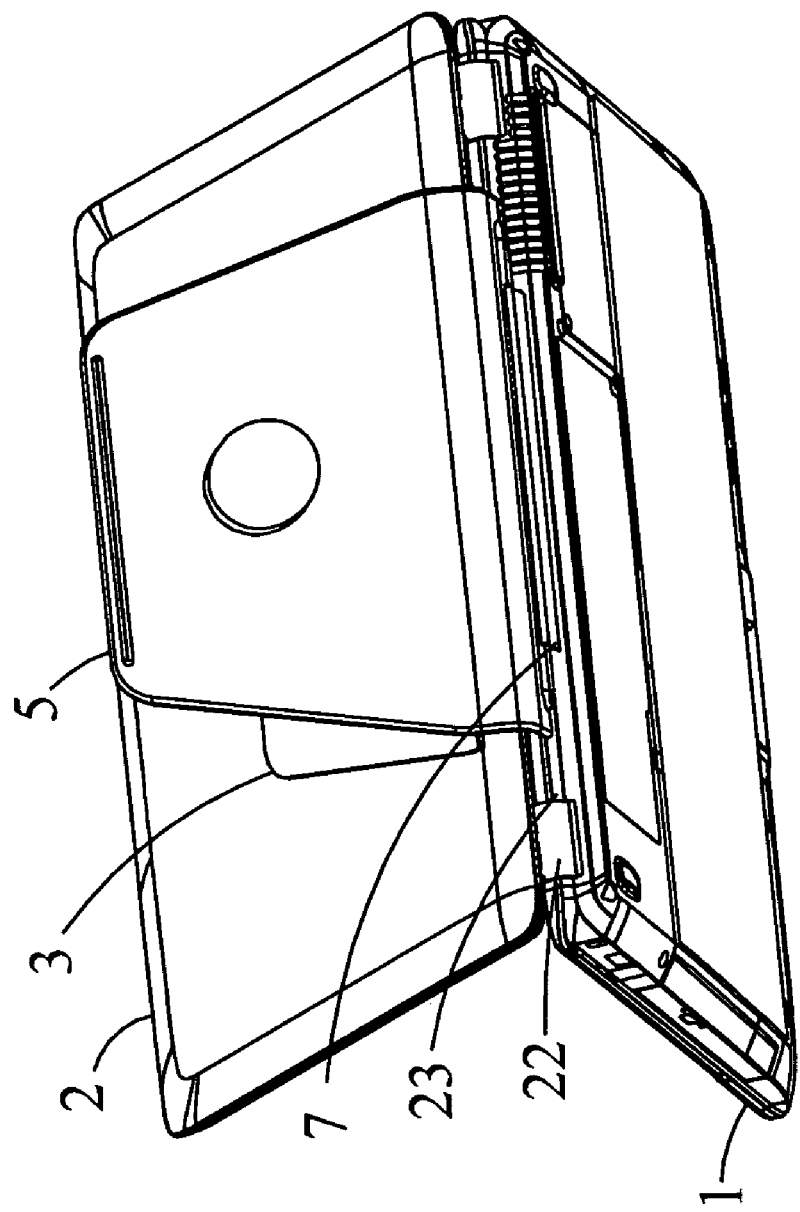
FIG. 1 is an assembled rear bottom perspective view of a notebook computer according to a first embodiment of the present invention with a top cover thereof in a half opened position.

The present invention will now be described with some preferred embodiments thereof. For the purpose of easy to understand, elements that are the same in the preferred embodiments are denoted by the same reference numerals.

Figure 2:
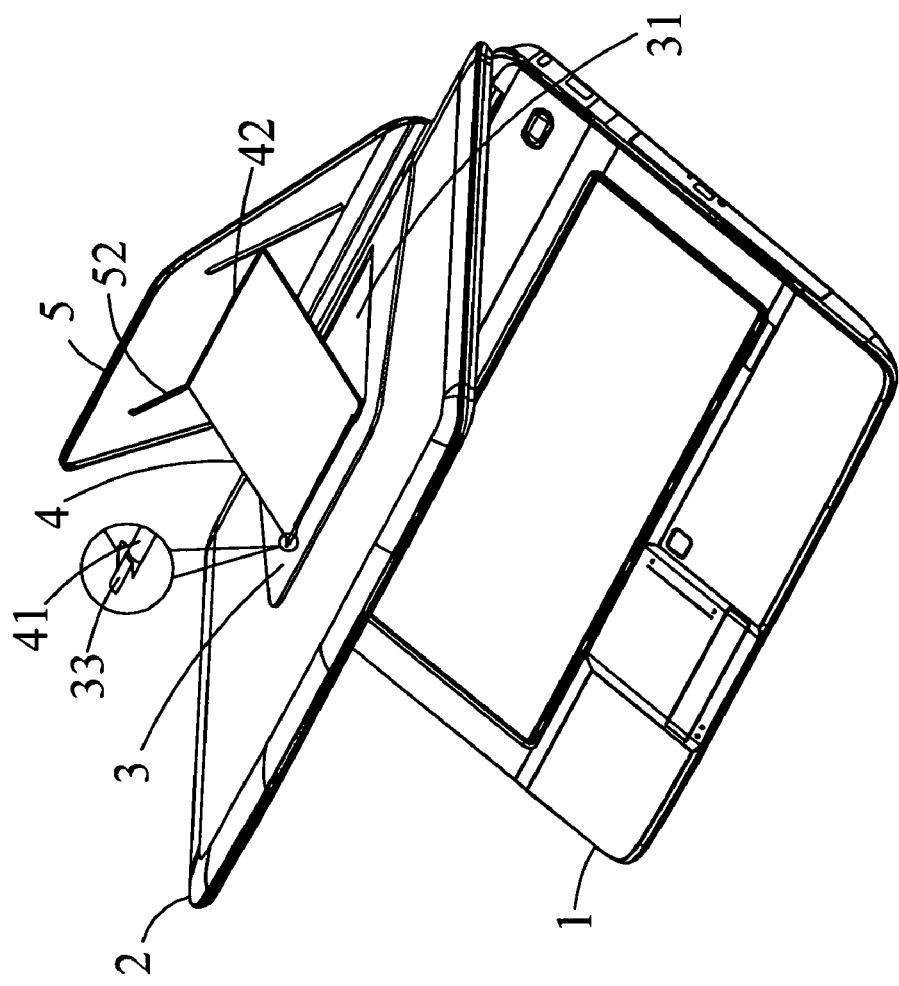
FIG. 2 is a front top perspective view of the notebook computer of FIG. 1.
Figure 3:
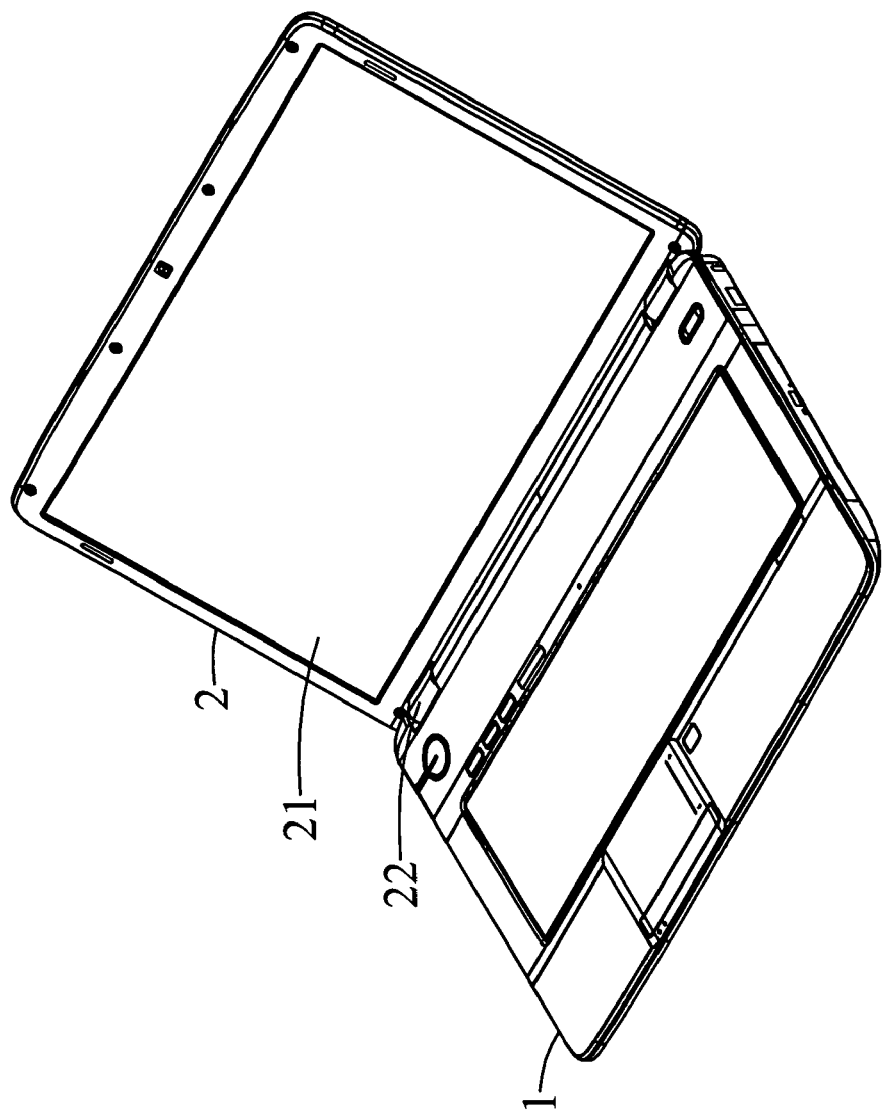
FIG. 3 is a front top perspective view of the notebook computer of FIG. 2 with the top cover thereof in a fully opened position.

Please refer to FIGS. 1 and 2 that are rear bottom and front top perspective views, respectively, of a notebook computer according to a first embodiment of the present invention with a top cover thereof in a half opened position; and to FIG. 3 that is a front top perspective view of the notebook computer of FIG. 2 with the top cover thereof in a fully opened position. As shown, the notebook computer according to the first embodiment of the present invention includes a base 1, a top cover 2, a first rotary shaft 22, a first plate member 3, a second plate member 4, a third plate member 5, a second rotary shaft 51 (see FIG. 5), and a fourth plate member 7. The base 1 is adapted to contact with an external flat surface, such as a desk top on which the notebook computer is positioned.

The top cover 2 has a display panel 21 disposed on an inner side thereof, and is movably coupled to the base 1 via the first rotary shaft 22 to pivotally turn relative to the base 1 between a closed position and an operation or opened position. In the illustrated embodiment of the present invention, the display panel 21 is a touch panel allowing a user to control the notebook computer by touching thereon.

The first plate member 3 is disposed on an outer side of the top cover 2 and can be in the form of a hollow frame, such that an inner periphery of the first plate member 3 and the top cover 2 together define a shallow recess to serve as an accommodating space 31. The first plate member 3 includes a clamping element 32 (see FIG. 4) and a pivot-shaft hole 33. The clamping element 32 is clamped on an end 23 of the top cover 2 close to the first rotary shaft 22. The first plate member 3 can be integrally formed with the top cover 2 to save additional cost of making a mold for forming the first plate member 3. The pivot-shaft hole 33 is disposed at a corner on the inner periphery of the first plate member 3, and the second plate member 4 is pivotally coupled to the first plate member 3 via the pivot-shaft hole 33.

The second plate member 4 has a first end pivotally coupled to the first plate member 3, and includes a pivot shaft 41 and a guide bar 42. The pivot shaft 41 is coupled to the first end of the second plate member 4, and has a length longer than a width of the second plate member 4 to thereby sidewardly project from one lateral edge of the second plate member 4. With these arrangements, the pivot shaft 41 can be held to the pivot-shaft hole 33. The guide bar 42 is transversely coupled at one side to an opposing second end of the second plate member 4 and has a length longer than the width of the second plate member 4, such that two ends of the guide bar 42 are sidewardly projected from two lateral edges of the second plate member 4.

The third plate member 5 is provided on an inner face near two lateral edges with two guide rails 52. The two ends of the guide bar 42 on the second plate member 4 are correspondingly slidably extended into the two guide rails 52 on the third plate member 5, so that the second plate member 4 is slidable relative to the third plate member 5 when the latter is turned. That is, the second and the third plate member 4, 5 can displace relative to each other when the third plate member 5 is turned. The third plate member 5 has a proximal end coupled to the second rotary shaft 51 for pivotally coupling to the base 1.

Figure 5:
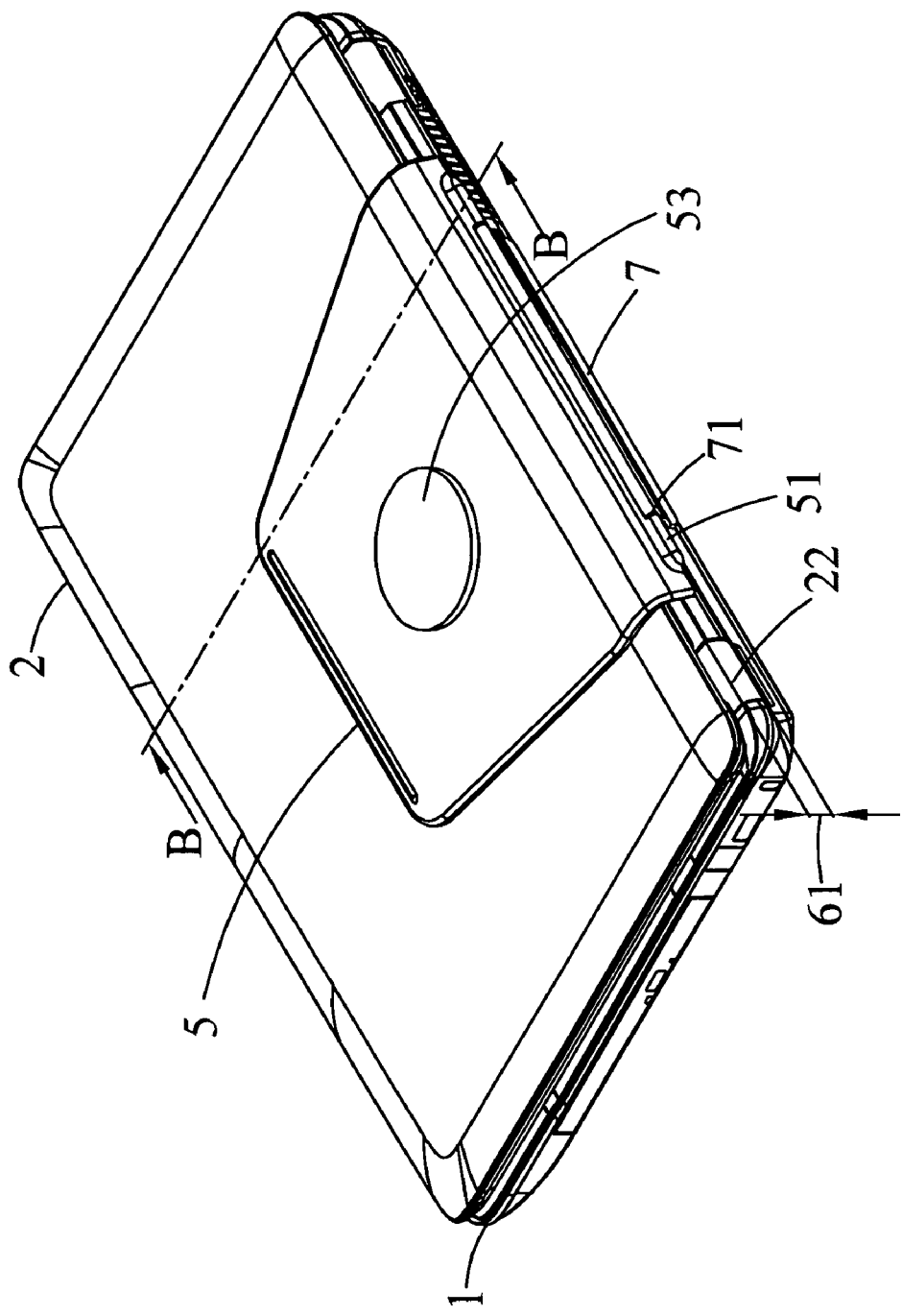
FIG. 5 is a rear top perspective view of the notebook computer of FIG. 1 with the top cover thereof in a fully closed position.

The fourth plate member 7 is provided on one side of the base 1 close to the first rotary shaft 22 and includes a shaft hole 71 (see FIG. 5). The second rotary shaft 51 is received in the shaft hole 71 to thereby pivotally couple the third plate member 5 to the fourth plate member 7. Since there is a height difference 61 between the first rotary shaft 22 and the second rotary shaft 51, as shown in FIG. 5, the first plate member 3, the second plate member 4, the third plate member 5, and the fourth plate member 7 together form a four-bar linkage to move at the same time. In the illustrated embodiment of the present invention, the fourth plate member 7 can be integrally formed on one side of the base 1 to save additional cost of making a mold for forming the fourth plate member 7.

Further, the third plate member 5 is provided on an outer face thereof with a buffer pad 53. When the top cover 2 is turned to the operation position, the buffer pad 53 is pressed against a working surface 62 (see FIG. 4) to protect the outer face of the third plate member 5 against scratches due to frictional contact with or collision with the working surface 62. In the illustrated embodiment of the present invention, the buffer pad 53 can be made of a rubber material without being limited thereto.

Figure 4:
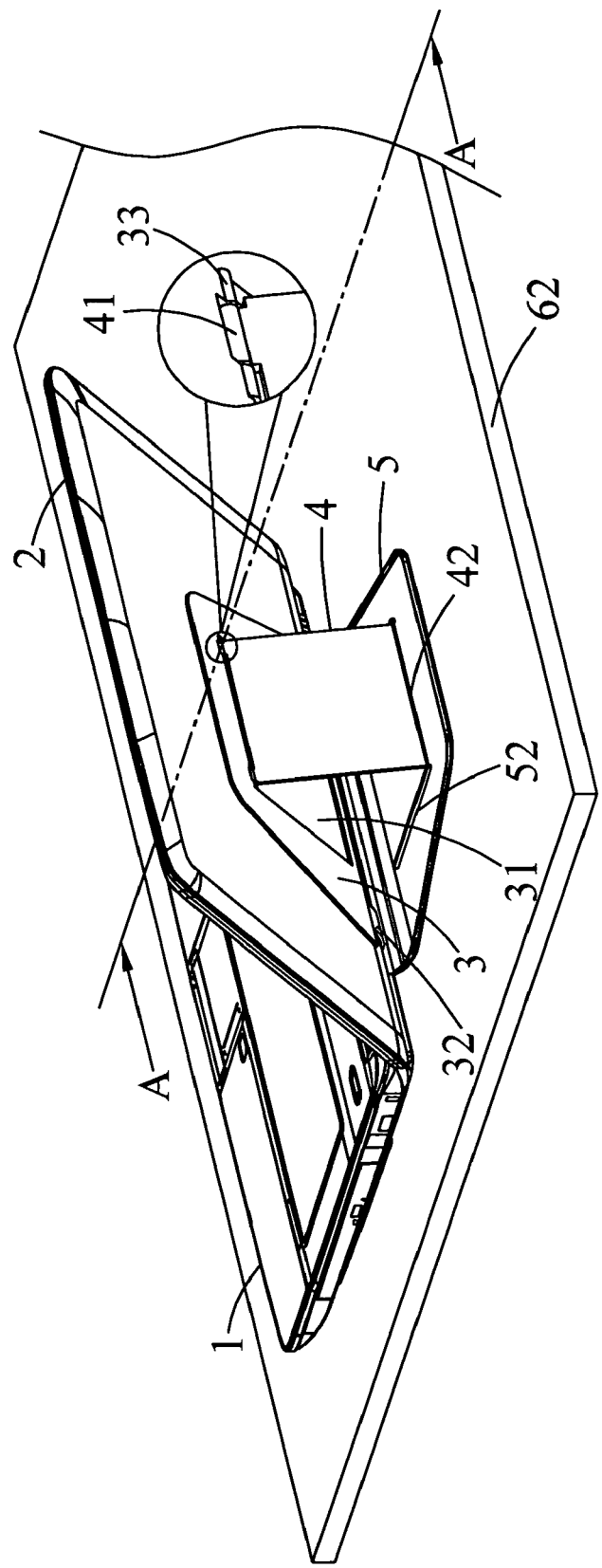
FIG. 4 is a rear perspective view of the notebook computer of FIG. 3.

FIG. 4 is a rear perspective view showing the notebook computer of the present invention in a fully opened position for operation. When the top cover 2 of the notebook computer is turned to the operation position, the second rotary shaft 51 (see FIG. 5) is brought to rotate simultaneously, so that the third plate member 5 is automatically turned away from the outer side of the top cover 2 to rest on the external working surface 62, such as a desk top on which the notebook computer is positioned. Meanwhile, the guide bar 42, which is originally disposed at an end of the guide rails 52 closer to the proximal end of the third plate member 5 when the top cover 2 is closed onto the base 1, is brought to slide along the guide rails 52 toward the other end thereof farther from the proximal end of the third plate member 5 when the top cover 2 is turned away from the base 1 for operation. When the guide bar 42 reaches at the other end of the guide rails 52, the second plate member 4 is held in a position with the guide bar 42 pushing against the third plate member 5, restricting the top cover 2 and the third plate member 5 from turning further. At this point, the second and the third plate member 4, 5 cooperatively support the top cover 2 to the operation position for use.

FIG. 5 shows the notebook computer of FIG. 1 in a fully closed state. Please refer to FIGS. 4 and 5 at the same time. In the process of turning the top cover 2 reversely from the operation position as shown in FIG. 4 to the closed position as shown in FIG. 5, the second rotary shaft 51 is brought to turn reversely, bringing the third plate member 5 to turn reversely toward the outer side of the top cover 2. Meanwhile, the guide bar 42, which is originally disposed at the other end of the guide rails 52 farther from the proximal end of the third plate member 5 when the top cover 2 is turned away from the base 1 to the operation position, is brought to slide along the guide rails 52 toward the end of the guide rails 52 closer to the proximal end of the third plate member 5 when the top cover 2 is closed onto the base 1. When the guide bar 42 reaches at the end of the guide rails 52 closer to the proximal end of the third plate member 5, the second plate member 4 is moved into the position of being received in the accommodating space 31, allowing the third plate member 5 to flatly bear on the first plate member 3, which is attached to the outer side of the top cover 2. Therefore, the notebook computer in the fully closed state has an integral, compact, and fashionable appearance.

When a user touches the touch panel 21 on the top cover 2 with fingers or a touch pen, since the second and the third plate member 4, 5 cooperatively support the top cover 2 to the operation position, the notebook computer is protected against any unstable state and wobble caused by the force applied by the user while touching the touch panel 21. Thus, the notebook computer according to the present invention provides enhanced operation accuracy and good touch during operation.

Figure 6:
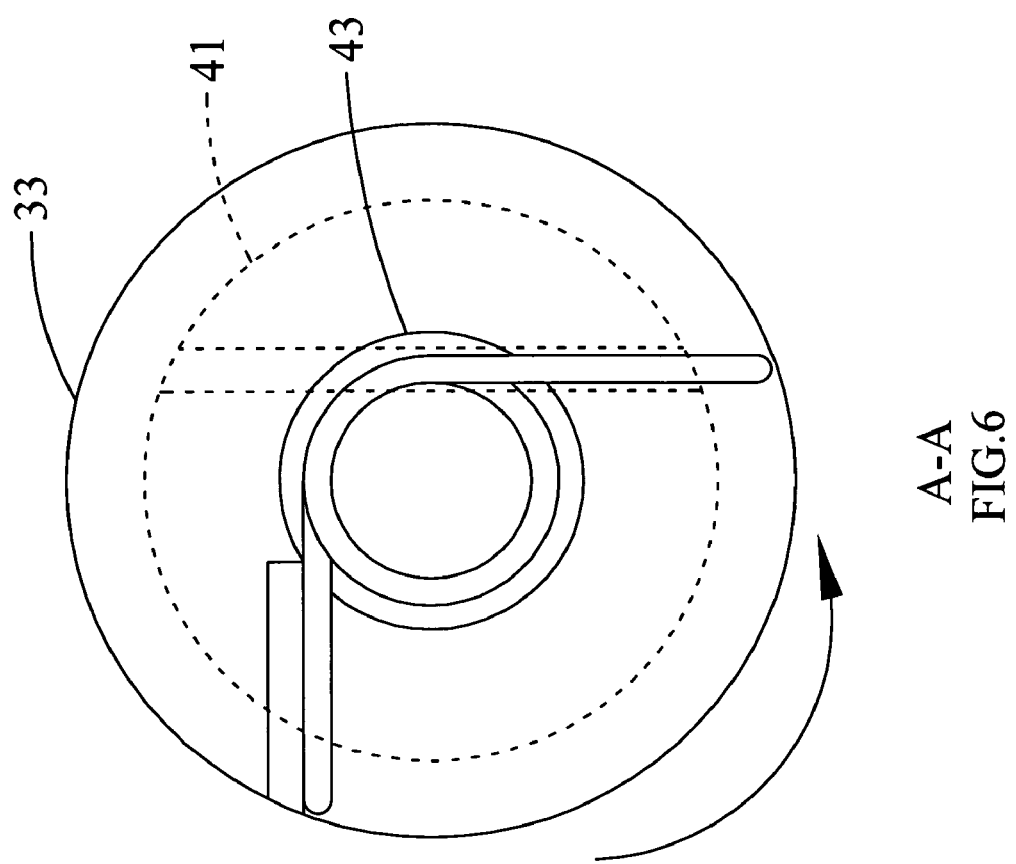
FIG. 6 is an enlarged sectional view of a torsional spring for a notebook computer according to a second embodiment of the present invention, as viewed at a position corresponding to that taken along line A-A of FIG. 4.
Figure 7:
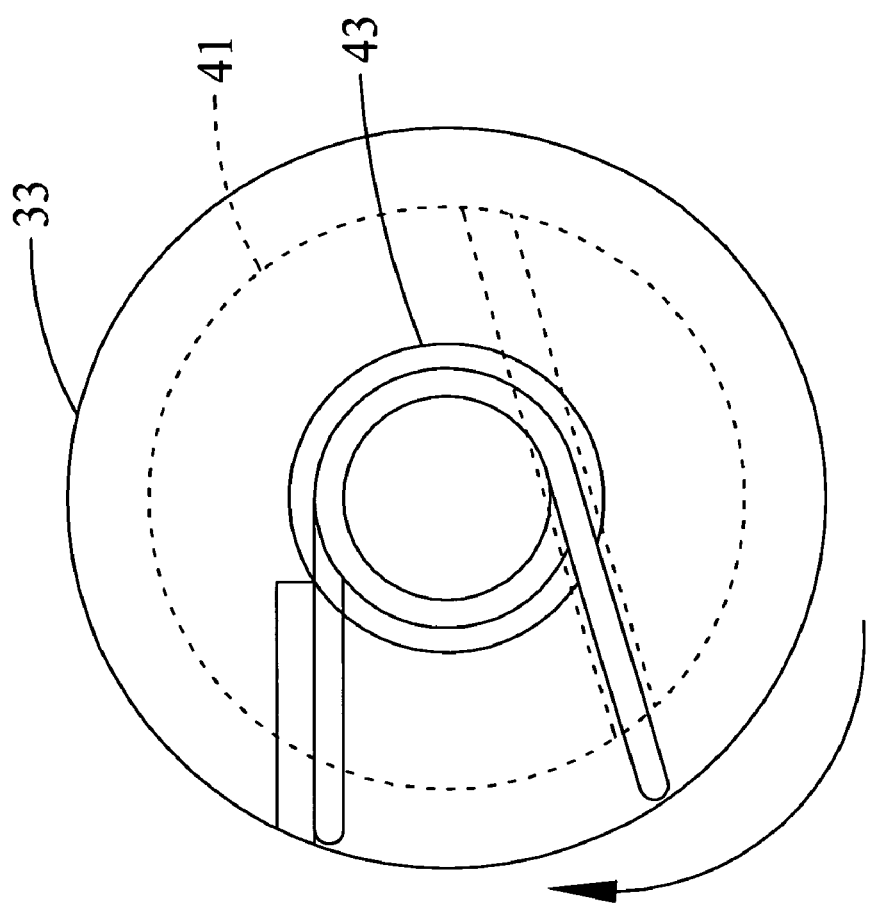
FIG. 7 is an enlarged sectional view of the torsional spring for the notebook computer according to the second embodiment of the present invention, as viewed at a position corresponding to that taken along line B-B of FIG. 5.

A notebook computer according to a second embodiment of the present invention further includes a torsional spring 43 provided on the second plate member 4. Since the notebook computers in the second embodiment and the first embodiment are generally structurally similar to each other with the only difference in the element, that is, the torsional spring 43, for mounting the second plate member 4 to the first plate member 3, only the torsional spring 43 is described herein while all other structures of the second embodiment that are similar to the first embodiment are not repeatedly described. FIG. 6 is an enlarged sectional view of the torsional spring 43 as viewed at a position corresponding to that taken along line A-A of FIG. 4; and FIG. 7 is an enlarged sectional view of the torsional spring 43 as viewed at a position corresponding to that taken along line B-B of FIG. 5. Please refer to FIGS. 6 and 7 along with FIGS. 4 and 5. The torsional spring 43 has two projected ends, and is fitted in the pivot-shaft hole 33 with one of the two projected ends fixed to the first plate member 3 and the other projected end engaged with the pivot shaft 41. The value of torsional force stored in the torsional spring 43 is variable with the displacement of the second plate member 4 relative to the first plate member 3.

When the top cover 2 is turned from the closed position as shown in FIG. 5 to the operation position as shown in FIG. 4, the torsional spring 43 releases the stored torsional force, so that the torsional force of the torsional spring 43 lowers from a maximum value to a minimum value. At this point, the guide bar 42 is assisted by the torsional force released from the torsional spring 43 to slide from the end of the guide rails closes to the proximal end of the third plate member 5 to the other end of the guide rails, and the top cover 2 is held to the operation position relative to the base 1.

The present invention has been described with some preferred embodiments thereof and it is understood that many changes and modifications in the described embodiments can be carried out without departing from the scope and the spirit of the invention that is intended to be limited only by the appended claims.

What is claimed is:
1. A notebook computer, comprising:
   a base;
   a top cover having a display panel disposed on an inner side thereof, and movably connecting to the base via a first rotary shaft to pivotally turn about the first rotary shaft relative to the base between a closed position and an operation position;
   a first plate member being provided on an outer side of the top cover;
   a second plate member being pivotally turnably coupled at a first end to the first plate member; and
   a third plate member being pivotally turnably coupled at a proximal end to the base via a second rotary shaft, the second plate member being slidably coupled at an opposing second end to the third plate member, such that the second plate member and the third plate member are displaceable relative to each other; and there being a height difference between the first rotary shaft and the second rotary shaft;
   wherein while the top cover is at the operation position, the second end of the second plate member is pushed against the third plate member to prevent the top cover and the third plate member from turning further, and the second plate member and the third plate member cooperatively support the top cover to the operation position.

2. The notebook computer as claimed in claim 1, wherein the first plate member and the top cover together define a accommodating space therebetween, and the second plate member being received in the accommodating space when the top cover is in the closed position.

3. The notebook computer as claimed in claim 1, wherein the third plate member is provided with two guide rails on an inner face, and the second plate member includes a guide bar; the guide bar is coupled at one side to the second end of the second plate member, and two ends of the guide bar are respectively insertably disposed into the two guide rails on the third plate member, such that the guide bar is slidable along the two guide rails, allowing the second plate member to slide relative to the third plate member.

4. The notebook computer as claimed in claim 1, wherein the first plate member includes a clamping element arranged for clamping onto an end of the top cover close to the first rotary shaft.

5. The notebook computer as claimed in claim 1, wherein the second plate member includes a torsional spring disposed at a pivot joint of the second and the first plate member; and a value of torsional force stored in the torsional spring is variable with a position of the second plate member relative to the first plate member.

6. The notebook computer as claimed in claim 5, wherein the torsional spring has a maximum value of torsional force when the top cover is held in the closed position, and is therefore helpful in turning the top cover to the operation position.

7. The notebook computer as claimed in claim 1, wherein the third plate member is provided with a buffer pad on an outer face; and the buffer pad being pressed against a working surface when the top cover is turned to the operation position.

8. The notebook computer as claimed in claim 7, wherein the buffer pad is made of a rubber material.

9. The notebook computer as claimed in claim 1, further comprising a fourth plate member being provided on one side of the base close to the first rotary shaft and including a shaft hole; and the second rotary shaft being received in the shaft hole to thereby pivotally turnably connect the third plate member to the fourth plate member.

10. The notebook computer as claimed in claim 9, wherein the fourth plate member is integrally formed with the base.

11. The notebook computer as claimed in claim 1, wherein the first plate member is integrally formed with the top cover.

12. The notebook computer as claimed in claim 1, wherein the display panel is a touch panel.

\* \* \* \* \*